United States Patent [19]
Premji

[11] Patent Number: 5,695,247
[45] Date of Patent: Dec. 9, 1997

[54] SAFETY LOCK-OUT MECHANISM FOR USE IN A SLIDING VEHICLE SEAT

[75] Inventor: Gulam Premji, Mississauga, Canada

[73] Assignee: Bertrand Faure Components Ltd., Mississauga, Canada

[21] Appl. No.: 715,652

[22] Filed: Sep. 18, 1996

[51] Int. Cl.$^6$ ............................................ B60N 2/06
[52] U.S. Cl. ............................. 297/341; 297/378.14
[58] Field of Search ........................ 297/341, 378.11, 297/378.14; 248/429

[56] References Cited

U.S. PATENT DOCUMENTS 2,803,290  8/1957  Schamel et al. .................... 297/341

FOREIGN PATENT DOCUMENTS 0205524  9/1986  Japan ............................... 297/341
2155780  10/1985  United Kingdom ................ 297/341

*Primary Examiner*—Peter M. Cuomo
*Assistant Examiner*—David E. Allred
*Attorney, Agent, or Firm*—Patrick J. Hofbauer

[57] ABSTRACT

A safety lock-out mechanism for use in a vehicle seat comprises a drive pin mounted on the seatback for movement between a initial free position and a retained position. A latch pawl is pivotally mounted on the baseplate for pivotal movement from a first position whereat the latch pawl is permitted to move from its latching position to its unlatching position under the urging by the drive pin, upon coincident respective movement of the drive pin from its initial free position to its retained position, at which retained position the drive pin is releasably latched. A blocking cam is pivotally mounted on the baseplate in progressive frictional contact with the latch pawl, for movement from a first position whereat the latch pawl is permitted to move from its latching position to its unlatching position under urging by the drive pin, to a blocking position whereat the latch pawl is retained in its latching position. A spring biases the blocking cam to its blocking position. A first cable member is interconnected between the blocking cam and a stationary portion of the vehicle seat track. Rearward sliding movement of the vehicle seat from its entry position to its design position causes the blocking cam to move to its first position under the urging of the first cable, thereby permitting the latch pawl to move from its latching position to its unlatching position, upon return movement of the drive pin from its retained position to its initial free position.

22 Claims, 4 Drawing Sheets

SAFETY LOCK-OUT MECHANISM FOR USE IN A SLIDING VEHICLE SEAT

FIELD OF THE INVENTION

The present invention relates to lock-out mechanisms for use within sliding vehicle seats, and more particularly to a safety lock-out mechanism that locks out the seatback of a vehicle seat from returning prematurely to an upright position from a forwardly folded position upon rearward sliding of the vehicle seat.

BACKGROUND OF THE INVENTION

In some compact and sub-compact two door vehicles, the front seats are readily moveable between an occupiable design position determined by vehicle designers as an optimal seating position for the majority of drivers and an entry position whereat the vehicle seat is disposed in a forward position and the seatback is disposed in an unoccupiable forwardly folded position, in order to permit ingress into or egress from the rear passenger area of the vehicle. Such vehicle seats, commonly known as an "easy entry" or walk-in vehicle seat mechanisms, may employ a manual latch or an inertia latch to releasingly latch the seatback in place in its generally upright occupiable position with respect to the seat cushion of the vehicle seat. It is known in such easy entry vehicle seats to have a sheathed release cable operatively secured at its one end to the bottom portion of the seatback and extending forwardly toward the actuating mechanism of the track lock mechanism of the vehicle seat track, where the opposite other end of the cable member is operatively secured. Accordingly, when ingress into or egress from the rear seat area is required, the seatback is folded forwardly, pulling on the cable member to unlock the track lock mechanism, thus releasing the movable vehicle seat track member with respect to the stationary vehicle seat track member, so as to permit forward sliding of the vehicle seat along the vehicle seat track. Typically, a coiled control spring urges the vehicle seat forwardly to its entry position, for the sake of convenience.

When ingress into or egress from the rear seat area is no longer required, the seatback is returned to its generally upright occupiable position, and the vehicle seat is slid rearwardly. Absent subsequent adjustment by a seat occupant, the vehicle seat will normally become locked upon such rearward travel with respect to the vehicle seat track, at its design position. However, after the seatback is initially returned to its generally upright occupiable position, it may appear to be occupiable before being moved rearwardly to its design position, which appearance is dangerous, as the vehicle seat may not be locked in place with respect to the vehicle seat track.

One known prior art reference that addresses the problem of ensuring that a seatback remains in its unoccupiable forwardly folded position until the vehicle seat is returned to its design position, is U.S. Pat. No. 5,368,355 (Hayden et al.), granted to General Motors Corporation on Nov. 29, 1994. The Hayden et al. Patent relates to a vehicle seat which is slidable along seat rails between an in-use seating position and a forwardly located storage position. In the seating position, a seating position pin is spring biased downwardly by a seating position return spring into a generally large opening in a lock plate member, which lock plate member is interposed between the upper and lower seat track rails. The seat position pin is controlled by a pin cable, which pin cable is connected at its distal end to a pivot handle. In operation, when it is desired to move the vehicle seat from its rearward seating position to the forward stored position, the seatback must first be pivoted to a forwardly folded position, thereby tensioning the handle lockout cable. The handle lockout cable acts upon a lock handle, so as to cause lock handle to pivot against a torsion spring, thereby to disengage a detent on the pivot handle, so as to allow the grip portion of the pivot handle to be manually pulled by the user to vertically remove the seating position pin, and optionally the storage position pin, from their respective holes in the locking plate. The vehicle seat is then free to slide forwardly.

In the stored position, the Hayden et al. seatback will be locked in its downwardly folded position by virtue of a lock lever. The lock lever is pulled into a locking position by tension in a lock-out cable caused by the rotation of a cam follower upon the aforesaid pivotal movement of the pivot handle. When an appropriate storage position of the vehicle seat is reached, the storage position pin will automatically, by underbiasing by a return spring, pop into its place at a storage opening in a storage position. The storage openings are sized smaller than the seating position openings, such that the seating position locking pin will not engage any one of the storage openings over which it may pass during forward sliding of the vehicle seat. In the storage position, the seatback cannot be raised to a raised position, since the seating position pin is not engaged, such that the lock lever lockingly engages the seatback plate. Thus, only when the vehicle seat is returned to a rear seating position, will the seating position pin engage a respective seating position opening, thus allowing the cam follower to rotate in a clockwise direction, thereby relieving tension on the lockout cable, which in turn will release the lock lever from the seatback plate.

Although the forward folding of the Hayden et al. seatback and the movement of the seat assembly to a stored position prevents return of the seatback to an upright occupiable position until such time as the seat assembly is returned to a permitted seating position, the Hayden et al. Patent does not teach a seatback lock-out mechanism useable in conjunction with an easy entry system. The Hayden et al Patent merely teaches the use of one or more locking pins, which locking pins selectively engage slots in the seat track slide under the influence of cable tensioning occasioned upon actuation of a locking handle manipulated by the user.

It should be understood that in conventional vehicle seats, one safety lock-out mechanism may be used on each opposite lateral side of a vehicle seat, or alternatively, only one safety lock-out mechanism may be used on one selected lateral side of a vehicle seat. If two safety lock-out mechanisms are used, they would work substantially simultaneously one with another.

It is an object of the present invention to provide a safety lock-out mechanism for use in an easy entry vehicle seat to preclude the return of the seatback of a vehicle seat to a generally upright occupiable position until the vehicle seat has returned rearwardly to a locked position.

It is a further object of the present invention to provide such a safety lock-out mechanism reliable in operation, simple to manufacture and install without extensive modification to existing vehicle seats and their track locking mechanisms, and which is light in weight.

SUMMARY OF THE INVENTION

In accordance with the present invention there is disclosed a safety lock-out mechanism for use in a vehicle seat having a hinge plate secured to a seatback and a baseplate secured to a seat cushion, with the hinge plate adjoined in pivotal relation to the baseplate for pivotal movement of the seatback about a seatback pivot axis between a generally upright occupiable position and a forwardly folded position. The seat cushion is mounted in slidable relation on a vehicle seat track for sliding movement between a design position whereat the vehicle seat is locked in place on the vehicle seat track by a track lock mechanism and the vehicle seat is occupiable, and an entry position whereat the vehicle seat is disposed forwardly of the design position so as to permit ingress into and egress from behind the vehicle seat. The safety lock-out mechanism comprises a drive member mounted on the hinge plate for movement with the hinge plate between an initial free position corresponding to the generally upright occupiable position of the seatback and a retained position corresponding to the forwardly folded position of the seatback. A latch means is operatively mounted on the baseplate for movement from an unlatching position to a latching position, under urging contact by the drive member, upon coincident respective movement of the drive member from its initial free position to its retained position, at which retained position the drive member is releasably latched. A blocking means is operatively mounted on the baseplate in progressive frictional contact with the latch means for movement from a first position whereat the latch means is permitted to move from its latching position to its unlatching position under the aforesaid urging by the drive member, to a blocking position whereat the latch means is retained in its latching position by the blocking means. There is a means for biasing the blocking means toward its blocking position. There is also a means operatively interconnected between the blocking means and a stationary portion of the vehicle seat track for urging the blocking means to its first position against the means for biasing the blocking means toward its blocking position upon rearwardly directed sliding movement of the vehicle seat from its entry position to its design position, thereby permitting the latch means to move from its latching position to its unlatching position upon return movement of the drive member from its retained position to its initial free position, coincident with the seatback being returned from its forwardly folded position to its generally upright occupiable position.

Other objects, advantages, features and characteristics of the present invention, as well as methods of operation and functions of the related elements of the structure, and the combination of parts and economies of manufacture, will become more apparent upon consideration of the following detailed description and the appended claims with reference to the accompanying drawings, the latter of which is briefly described hereinbelow.

BRIEF DESCRIPTION OF THE DRAWINGS

The novel features which are believed to be characteristic of the safety lock-out mechanism for use in a vehicle seat according to the present invention, as to its structure, organization, use and method of operation, together with further objectives and advantages thereof, will be better understood from the following drawings in which a presently preferred embodiment of the invention will now be illustrated by way of example. It is expressly understood, however, that the drawings are for the purpose of illustration and description only and are not intended as a definition of the limits of the invention. Embodiments of this invention will now be described by way of example in association with the accompanying drawings in which.

DETAILED DESCRIPTION OF A PREFERRED EMBODIMENT

Figure 1:
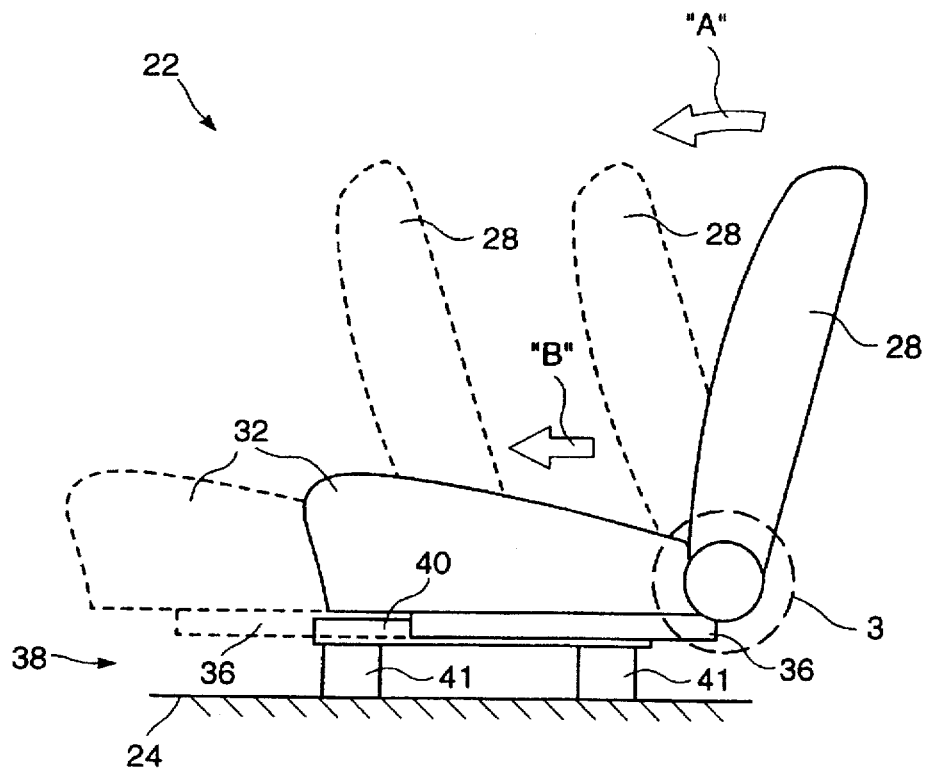
FIG. 1 diagrammatic side elevational view of an exemplary vehicle seat having the safety lock-out mechanism of the present invention installed thereon, showing the vehicle seat in solid lining in a design position, showing the seatback in dashed outline moving from an upright occupiable position to a forwardly folded position, and showing the vehicle seat in dashed outline in an entry position.
Figure 2:
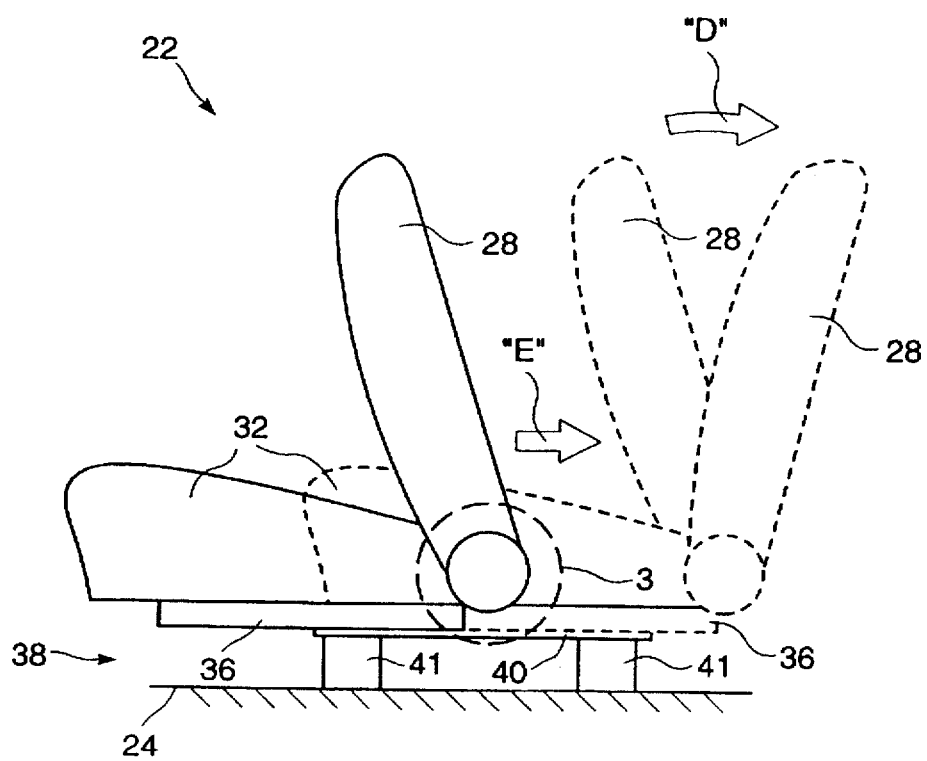
FIG. 2 is a diagrammatic side elevational view of the vehicle seat assembly and safety lock-out mechanism according to FIG. 1, showing the vehicle seat in solid lining in an entry position, showing the seatback in dashed outline in a forwardly folded position, and showing the vehicle seat in dashed outline in a design position, with the seatback having moved to an upright occupiable position.

Referring now to FIGS. 1 and 2 of the drawings, the safety lock-out mechanism of the present invention is for use in a conventional vehicle seat, as indicated by the general reference numeral 22, typically a front vehicle seat of a compact or sub-compact automobile, the floor 24 of which vehicle is shown in FIGS. 1 and 2. The safety lock-out mechanism is situated on the vehicle seat 22 in the area of the dotted circle 3 of FIGS. 1 and 2, and is designated in the remaining Figures by the general reference numeral 20. One safety lock-out mechanism 20 is preferably associated with each opposite lateral side of the vehicle seat 22, although only one such mechanism will be described in detail for the sake of brevity and clarity, with the duplicate set of reference numerals in FIG. 3 applying to the analogous components of the other such safety lock-out mechanism associated with the opposite other lateral side of the vehicle seat 22. In FIGS. 1 and 2, the safety lock-out mechanism 20 is obscured by conventional seat hinge and trim coverings, such that details of its various components and structure are best seen in FIGS. 3 to 5.

The vehicle seat 22 has a conventional hinge plate 26 secured in any known manner to a seatback 28 and a baseplate 30 similarly secured to a seat cushion 32. The hinge plate 26 is adjoined in pivotal relation to the baseplate 30 by means of a common pivot 34 for pivotal movement of the seatback 28 about a seatback pivot axis "S", as can best be seen in FIGS. 4 and 5. The hinge plate 26, and therefore the seatback 28, pivotally move with respect to the baseplate 30, and therefore the seat cushion 32, between a generally upright occupiable position, as illustrated in solid lining in FIG. 1, and a forwardly folded position, as illustrated in solid lining in FIG. 2. In the generally upright occupiable position, which position is defined by a stop means 29 rigidly secured on the hinge plate 26, coming into contact with a stop surface 31 on the baseplate 30, the seatback 28 is reclined slightly rearwardly of true vertical and the vehicle seat 22 is occupiable. In its forwardly folded position, sufficient room is provided to allow for ingress into or egress from behind the vehicle seat 22, typically into or out of the rear passenger area (not shown) of the vehicle. The seat cushion 32 of the vehicle seat 22 is secured on its underside to the two (left and right) movable vehicle seat track members 36 of a vehicle seat track assembly, as indicated by the general reference numeral 38, which vehicle seat track assembly 38 is seen fully in FIG. 3.

Figure 3:
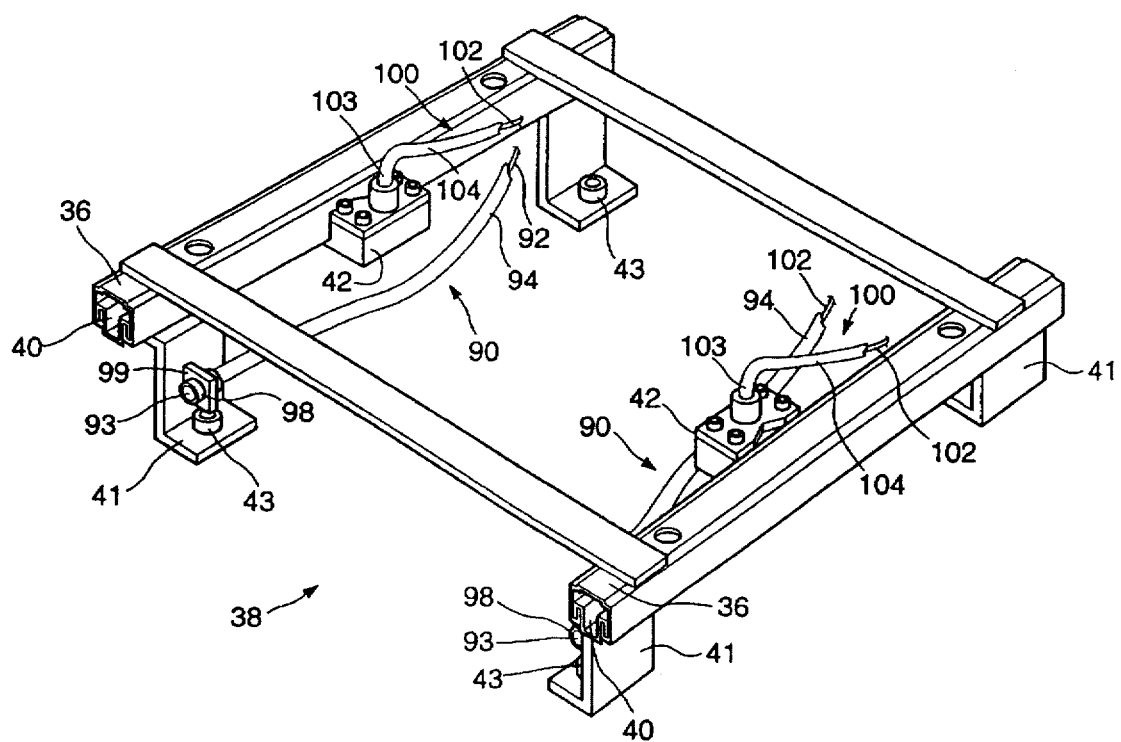
FIG. 3 is a top side perspective view from the front of the vehicle seat track assembly of the vehicle seat of FIG. 1, with the cable members of the safety lock-out mechanism shown attached thereto.

Co-operating stationary vehicle seat track members 40 are secured to the floor 24 of the vehicle by means of legs 41 and bolts 43, as can be best seen in FIG. 3, and receive thereon the respective movable vehicle seat track members 36 for sliding movement therealong. The seat cushion 32 is thereby mounted in slidable relation on the vehicle seat track assembly 38, for sliding movement between the design position and the entry position. In its design position, shown in FIG. 1, the vehicle seat 22 is locked in place on the vehicle seat track assembly 38 by a track lock mechanism 42 and the vehicle seat 22 is safely occupiable. In its entry position, shown in solid outline in FIG. 2, the vehicle seat 22 is disposed forwardly of its design position so as to permit ingress into and egress from behind the vehicle seat 22.

Figure 4:
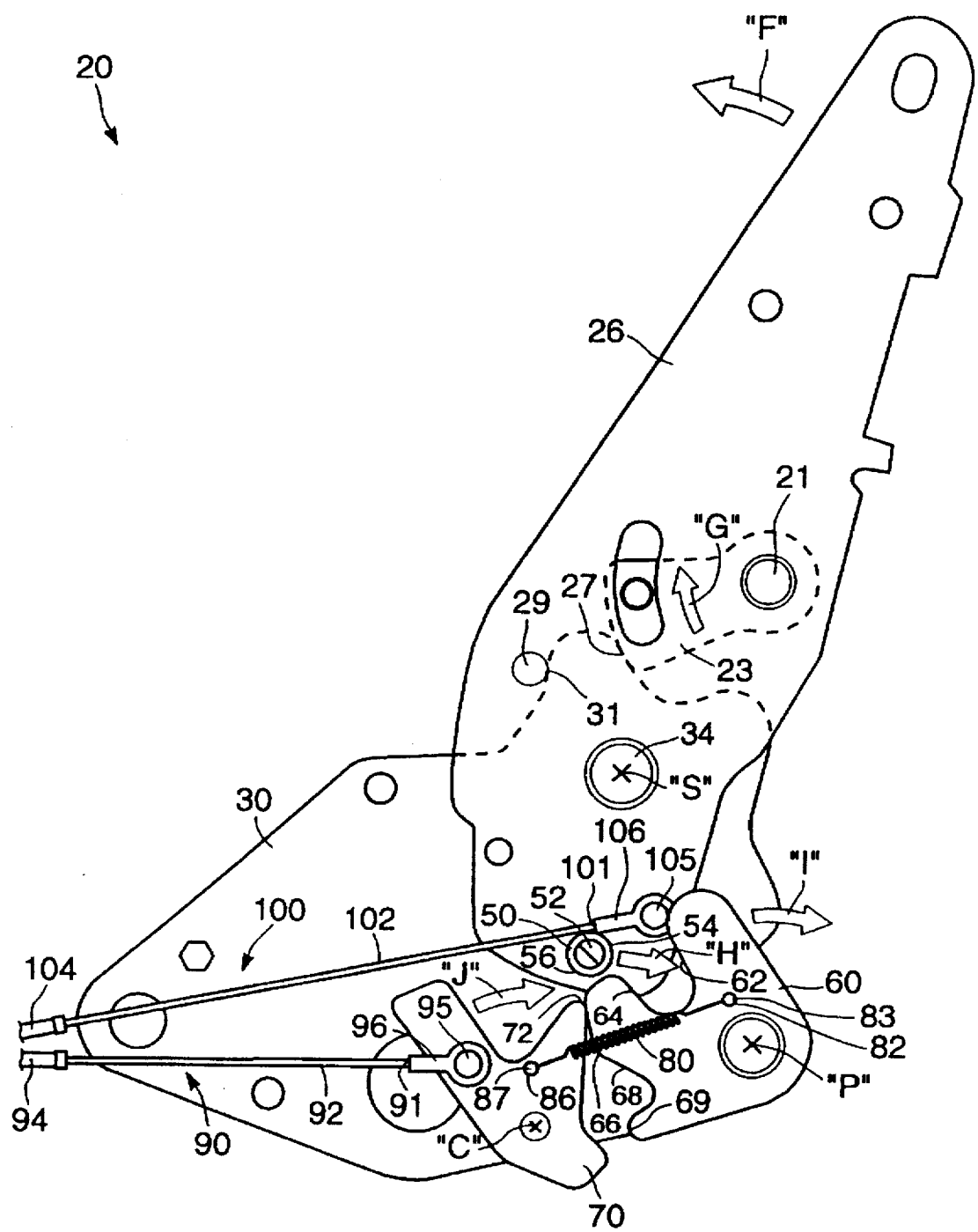
FIG. 4 is an enlarged side elevational view of the safety lock-out mechanism according to a preferred embodiment of the invention, with the mechanism corresponding to the seatback of the vehicle seat being in a generally upright occupiable position; and, FIG. 5 is an enlarged side elevational view of the safety lock-out mechanism of FIG. 4, with the mechanism corresponding to the seatback of the vehicle seat being in a forwardly folded position.
Figure 5:
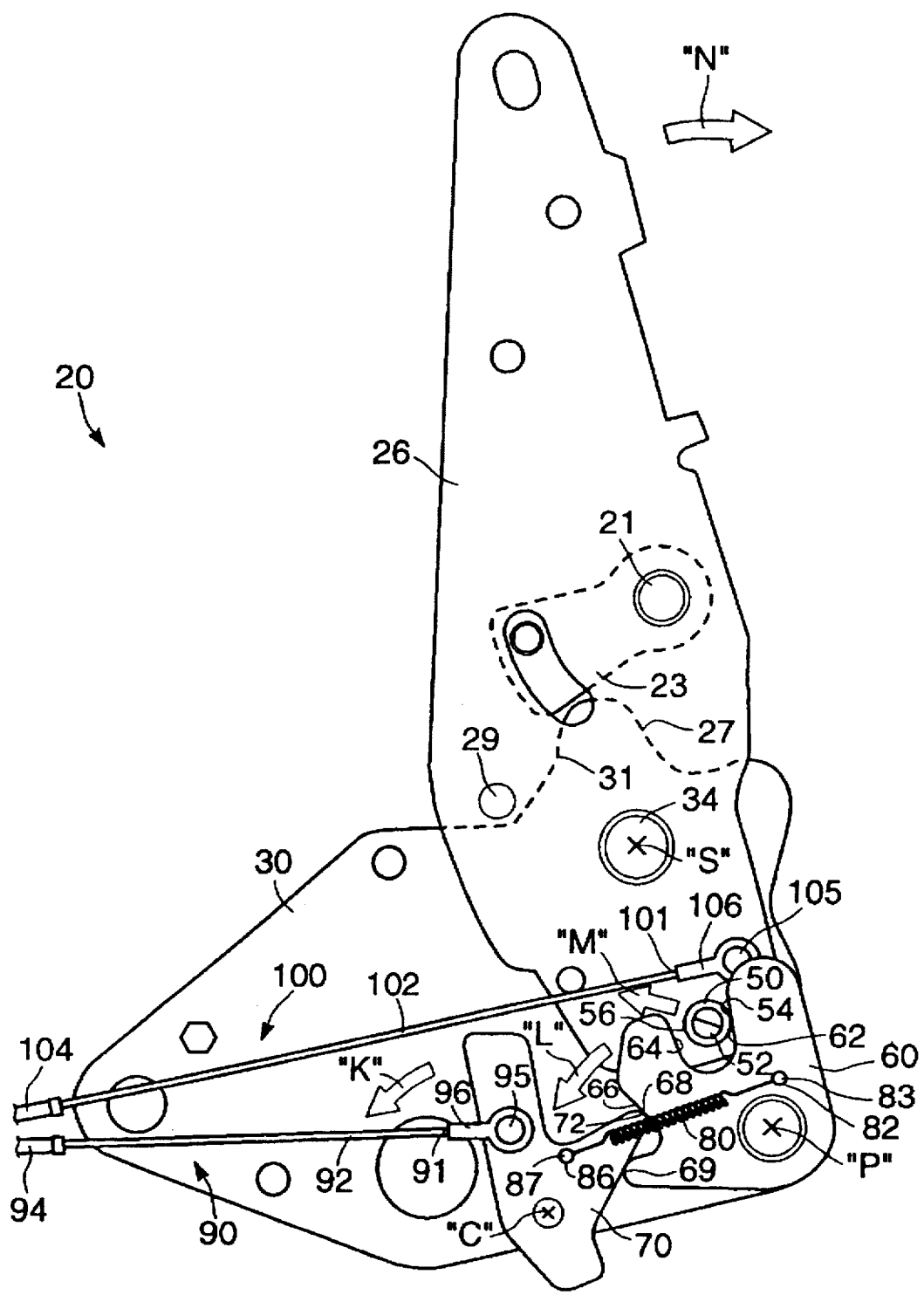

Turning to FIGS. 4 and 5, the preferred embodiment of the safety lock-out mechanism 20 of the present invention comprises a drive member operatively mounted on the hinge plate 26 for movement with the hinge plate 26 between an initial free position, corresponding to the upright occupiable position of the seatback 28, and a retained position corresponding to the forwardly folded position of the seatback 28. In the preferred embodiment illustrated, the drive member comprises a drive pin 50 securely attached to the hinge plate 26 by means of a central mounting bolt 52. The drive pin 50 includes a drive surface 54 and a latch receiving surface 56 that are generally oppositely directed one from the other in spaced relation. Preferably, the drive pin 50 is securely attached to the hinge plate 26 below the seatback pivot axis, such that forward pivotal movement of the seatback 28 will cause generally rearwardly directed movement of the drive pin 50.

A latch means, in the form of a latch pawl member 60, is pivotally mounted on the baseplate 30 for pivotal movement about a pawl pivot axis "P" between an unlatching position, as can be best seen in FIG. 4, and a latching position, as can be best seen in FIG. 5. The latch pawl member 60 is pivotally moveable about the pawl pivot axis "P", from its unlatching position to its latching position, under urging contact by the drive pin 50, upon movement of the drive pin 50 from its initial free position to its retained position. The latch pawl member 60 has disposed thereon a pick-up surface 62, and a latch surface 64 which generally face each other in opposed spaced relation, together with a cam follower surface 66 that is generally convex in shape. The pick-up surface 62 is positioned to receive the drive surface 54 on the drive pin 50 upon the aforesaid coincident respective movement of the drive member, from its initial free position to its retained position. In its latching position, the latch surface 64 of the latch pawl member 60 opposes the latch receiving surface 56 on the drive pin 50 to thereby releasably latch the drive pin 50 in its retained position, as will become apparent as this description proceeds.

A blocking means in the form of a blocking cam member 70 is pivotally mounted on the baseplate 30, in progressive frictional contact with the latch pawl member 60, for pivotal movement about a cam pivot axis "C" from a first position, as can best be seen in FIG. 4, to a blocking position, as can best be seen in FIG. 5, and ultimately back again to its first position, as will be described in greater detail subsequently. Preferably, the cam pivot axis "C" and the pawl pivot axis "P" are substantially parallel one to the other, and the cam pivot axis "C" is disposed forwardly of the pawl pivot axis "P". Also, the blocking cam member 70 preferably pivots in a first pivotal direction about the cam pivot axis "C" and the latch pawl member 60 pivots in the same first pivotal direction about the pawl pivot axis "P", when respectively acted upon by the drive pin 50 and a first cable member 90 described more fully below.

When the blocking cam member 70 is in its first position, the latch pawl member 60 is permitted to move from its unlatching position to its latching position, under the urging of the drive pin 50, which urging occurs when the seatback 22 is moved from its generally upright occupiable position to its forwardly folded position. Further, when the blocking cam member 70 is in its first position, the latch pawl member 60 is permitted to return from its latching position to its unlatching position, under the urging of the drive pin 50, which urging occurs when the seatback 22 is moved from its forwardly folded position to its generally upright occupiable position. However, when the blocking cam member 70 is moved to its blocking position (as shown in FIG. 5), the latch pawl member 60 is retained in its latching position.

In its the blocking position, (see FIG. 5), a substantially convex cam surface 72 on the blocking cam member 70 operatively engages the cam follower surface 66 to establish progressive frictional contact as the blocking cam member 70 moves from its first position to its blocking position. The substantially convex cam surface 72 on the blocking cam member 70 operatively engages a contact portion 68 of the cam follower surface 66 on the latch pawl member 60 so as to block the latch pawl member 60 in its latching position. This in turn prevents the seatback 28 from returning to its upright occupiable position. When the blocking cam member 70 is returned to its first position, (see FIG. 4), the cam surface 72 on the cam member 70 is removed from engagement with the contact portion 68 of the cam follower surface 66 on the latch pawl member 60, thereby permitting the latch pawl member 60 to return to its unlatching position, and the seatback 28 to return to its upright occupiable position.

A stop surface 69 is disposed on the latch pawl member 60 adjacent the contact portion 68 of the cam follower surface 66, such that the stop surface 69 contacts a portion of the blocking cam member 70 so as to arrest further movement of the blocking cam member 70 at its blocking position, when the blocking cam member 70 is moved from its first position to its blocking position.

A means for biasing the blocking cam member 70 toward its blocking position preferably comprises a coil spring 80 operatively interconnected between the latch pawl member 60 and the blocking cam member 70. The coil spring 80 is connected at its one end 82 to a pin member 83 on the latch pawl member 60 and operatively connected at its opposite other end 86 to a pin member 87 on the blocking cam member 70 so as to be in tension. Accordingly, the cam surface 72 on the blocking cam member 70 and the cam follower surface 66 on the latch pawl member 60 are spring biased into contact with each other at all times. Accordingly, upon movement of the latch pawl member 60 from its unlatching position to its latching position, upon urging contact by the drive pin 50, the blocking cam member 70 is moved, by the spring member 80, to its blocking position, whereat the latch pawl member 60 is blocked in its latching position, by the blocking cam member 70.

A means is provided, in the form of a first cable member, indicated by the general reference numeral 90, operatively interconnected between the blocking cam member 70 and a stationary portion of the vehicle seat track assembly 38, for urging the blocking cam member 70 to its first position upon rearwardly directed sliding movement of the vehicle seat 22 from its entry position to its design position. As previously noted, when the blocking cam member 70 is in its first position, the latch pawl member 60 is permitted to move from its latching position to its unlatching position, upon return movement of the drive pin 50 from its retained position to its initial free position, which return movement is coincident with the seatback 28 being returned from its forwardly folded position to its generally upright occupiable position.

Preferably, the first cable member 90 is a sheathed Bowden type cable having a cable portion 92 slidably movable within a sheath portion 94. A connector ring 96 is securely crimped onto one end 91 of the cable portion 92 of the first cable member 90 and is securely attached to the blocking cam member 70 by, for example, a rivet 95 extending through the connector ring 96 and fastened to the blocking cam member 70. A terminating lug 98 is crimped onto the other opposite end 93 of the sheath portion 94 of the first cable member 90, and is securely retained on the stationary vehicle seat track member 40 at a mounting flange 99. The opposite other end 93 of the cable portion 92 of the first cable member 90 is enlarged into the form of a button member, which button member is held fast within the terminating lug 98.

The safety lock-out mechanism 20 of the present invention further preferably comprises means, in the form of a second cable member as indicated by the general reference numeral 100, for operatively interconnecting the seatback 28 and the track lock mechanism 42 one to the other. Preferably, the second cable member 100 is also a sheathed Bowden type cable having a cable portion 102 slidably movable within a sheath portion 104. A connector ring 106 securely crimped onto one end 101 of the cable portion 102 of the second cable member 100, which connector ring is securely attached to the hinge plate 26, below the seatback pivot axis, by means of a rivet 105 extending through the connector ring 106 and fastened to the hinge plate 26, as shown. The opposite other end 103 of the cable portion 102 of the second cable member 100 is securely retained in operative relation by the actuator mechanism (not visible) within a known track lock mechanism 42. Forward folding of the seatback 28 from the generally upright occupiable position to the forwardly folded position pulls rearwardly on the cable portion 102, so as to cause actuation of the track lock mechanism 42, to thereby unlock the vehicle seat 22 from the vehicle seat track assembly 38, thus permitting the vehicle seat 22 to slide forwardly along the vehicle seat track assembly 38.

In use, when it is desired ingress into or egress from behind the vehicle seat 22, a latch member 23 of a conventional manual seat latch 23 is pivotally moved upwardly, about pivot pin 21 as indicated by arrow "G" in FIG. 4, until the seat latch member 23 clears a contact surface 27 on the base plate 30, as can be best seen in FIG. 5. The hinge plate 26 can then be pivoted forwardly, as indicated by arrow "F" in FIG. 4, which forward pivoting corresponds to forward folding of the seat back 28 indicated by arrow "A" in FIG. 1 from its generally upright occupiable position as illustrated in solid lining in FIG. 1, to a forwardly folded position, as illustrated in solid lining in FIG. 2. The vehicle seat 22 is then moved forwardly as illustrated by arrow "B" in FIG. 1, to an entry position illustrated in dashed outline in FIG. 1 and in solid lining in FIG. 2.

The forward folding of the seat back 28, and thus the hinge plate 26, causes the drive pin 50 to move rearwardly, as indicated by arrow "H" in FIG. 4, until the drive surface 54 of the drive pin 50 is received by the pick up surface 62 on the latch pawl 60. The latch pawl member 60 is then rotated clockwise, as indicated by arrow "I" in FIG. 4, from its unlatching position to its latching position, as can be best seen in FIG. 5, under urging contact by the drive pin 50, upon coincident respective movement of the drive pin 50 from its initial free position to its the retained position, at which retained position the drive pin 50 is releasably latched.

Also, as the seatback 28 pivots forwardly, the cable portion 102 of the second cable member 100 pulls on the track lock mechanism 42 so as to actuate it, thereby unlocking the vehicle seat 22 from the vehicle track assembly, thus permitting the vehicle seat 22 to slide forwardly as indicated by arrow "B" in FIG. 1.

As the latch pawl 60 moves from its unlatching position to its latching position, the blocking cam member 70 moves, as indicated by arrow "J" in FIG. 4, from its first position, as can be best seen in FIG. 4, to its blocking position, as can best seen in FIG. 5, as pulled by spring member 80. When the blocking cam member 70 is in its first position, the latch means is permitted to move from its latching position to its unlatching position under the urging by the drive member. In its blocking position, the cam surface 72 on the blocking cam member 70 operatively engages the contact portion 68 of the cam follower surface 66 on the latch pawl 60. The latch pawl 60 is thereby blocked in its latching position. As can be best seen in FIG. 5, the seat back 22 is thereby precluded from returning to its generally upright occupiable position by virtue of the latch pawl member 60 being blocked in its latching position by the blocking cam member 70.

In order to return the vehicle seat 22 from its entry position, as illustrated in solid lining in FIG. 2, to its design position, as illustrated in dashed outline in FIG. 2, the vehicle seat is pushed rearwardly, as indicated by arrow "E" in FIG. 2. As the vehicle seat 22 reaches its design position, the cable portion 92 of the first cable member 90 pulls the blocking cam member 70, as indicated by arrow "K" in FIG. 5, from its blocking position, as can be best seen in FIG. 5, to its first position, as can be best seen in FIG. 4. The latch pawl member 60 is coincidentally pulled, as indicated by arrow "L" in FIG. 5, from its latching position, as can be best seen in FIG. 5, to its unlatching position, as can best be seen in FIG. 4. The drive pin 50 thereby becomes unlatched for movement, as indicated by arrow "M", from its retained position, as can be best seen in FIG. 5, back to its initial free position, as can be best seen in FIG. 4. The hinge plate 26 can, accordingly, rotate clockwise, as indicated by arrow "N" in FIG. 5, which rotation corresponds to the return movement of the seat back 28, as indicated by arrow "D" in FIG. 2, to its generally upright occupiable position, as illustrated in solid lining in FIG. 1. The manual seat latch 23 is able to then return to its original latching position.

Other modifications and alterations may be used in the design and manufacture of the apparatus of the present invention without departing from the spirit and scope of the accompanying claims.

I claim:

1. A safety lock-out mechanism for use in a vehicle seat having a hinge plate secured to a seatback and a baseplate secured to a seat cushion, with said hinge plate adjoined in pivotal relation to said baseplate for pivotal movement of said seatback about a seatback pivot axis between a generally upright occupiable position and a forwardly folded position, said seat cushion being mounted in slidable relation on a vehicle seat track for sliding movement between a design position whereat said vehicle seat is locked in place on said vehicle seat track by a track lock mechanism and said vehicle seat is occupiable, and an entry position whereat said vehicle seat is disposed forwardly of said design position so as to permit ingress into and egress from behind the vehicle seat, said safety lock-out mechanism comprising:

a drive member mounted on said hinge plate for movement with said hinge plate between an initial free position corresponding to the generally upright occupiable position of said seatback and a retained position corresponding to the forwardly folded position of said seatback;

latch means operatively mounted on said baseplate for movement from an unlatching position to a latching position, under urging contact by said drive member, upon coincident respective movement of said drive member from said initial free position to said retained position, at which retained position said drive member is releasably latched;

blocking means operatively mounted on said baseplate in progressive frictional contact with said latch means for movement from a first position whereat said latch means is permitted to move from said latching position to said unlatching position under said urging by said drive member, to a blocking position whereat said latch means is retained in said latching position by said blocking means;

means for biasing said blocking means toward said blocking position;

means operatively interconnected between said blocking means and a stationary portion of said vehicle seat track for urging said blocking means to said first position against said means for biasing said blocking means toward said blocking position upon rearwardly directed sliding movement of said vehicle seat from said entry position to said design position, thereby permitting said latch means to move from said latching position to said unlatching position upon return movement of said drive member from said retained position to said initial free position, coincident with said seatback being returned from said forwardly folded position to said generally upright occupiable position.

2. The safety lock-out mechanism of claim 1, wherein said drive member comprises a drive pin.

3. The safety lock-out mechanism of claim 2, wherein said drive pin includes a drive surface and a latch receiving surface generally oppositely directed one from the other.

4. The safety lock-out mechanism of claim 3, wherein said drive pin is securely attached to said hinge plate below said seatback pivot axis.

5. The safety lock-out mechanism of claim 4, wherein said latch means receives said drive surface of said drive pin when said drive pin moves from said initial free position toward said retained position.

6. The safety lock-out mechanism of claim 5, wherein said latch means comprises a latch pawl member pivotally mounted on said baseplate for said pivotal movement about a pawl pivot axis from said unlatching position to said latching position.

7. The safety lock-out mechanism of claim 6, wherein said latch pawl member has a pick-up surface disposed thereon so as to be positioned to receive said drive surface on said drive pin, upon said coincident respective movement of said drive member from said initial free position to said retained position.

8. The safety lock-out mechanism of claim 7, wherein said latch pawl member has a latch surface disposed thereon so as to oppose said latch receiving surface on said drive pin to thereby releasably latch said drive pin in said retained position, as aforesaid.

9. The safety lock-out mechanism of claim 8, wherein said blocking means comprises a blocking cam member pivotally mounted on said baseplate for pivotal movement about a cam pivot axis between said first position and said blocking position.

10. The safety lock-out mechanism of claim 9, wherein said latch pawl member has a cam follower surface thereon, and said blocking cam member has a cam surface thereon, wherein said cam surface on said blocking cam member operatively engages said cam follower surface on said latch pawl member to establish said progressive frictional contact as said blocking cam member moves from its first position to its blocking position.

11. The safety lock-out mechanism of claim 10, wherein said means for biasing said blocking means to said blocking position comprises a coil spring operatively mounted at said one end to said latch pawl member and operatively mounted at said other opposite end to said blocking cam member.

12. The safety lock-out mechanism of claim 11, wherein said coil spring is in tension.

13. The safety lock-out mechanism of claim 12, wherein said means for operatively interconnecting said blocking means and a stationary portion of said vehicle seat track one to the other, comprises a first cable member.

14. The safety lock-out mechanism of claim 10, further comprising means for operatively interconnecting said seatback and said track lock mechanism one to the other, such that forward folding of said seatback from said generally upright occupiable position to said forwardly folded position causes actuation of said track lock mechanism to thereby unlock said vehicle seat from said vehicle seat track, thus permitting said vehicle seat to slide forwardly along said vehicle seat track.

15. The safety lock-out mechanism of claim 14, wherein said means for operatively interconnecting said seatback and said track lock mechanism one to the other comprises a second cable member secured at said one end to said hinge plate below said seatback pivot axis and at said opposite other end to said track lock mechanism.

16. The safety lock-out mechanism of claim 15, wherein said cam follower surface on said latch pawl member is substantially convex in shape.

17. The safety lock-out mechanism of claim 16, wherein said cam surface on said cam member is substantially convex in shape.

18. The safety lock-out mechanism of claim 17, further comprising a stop surface disposed on said latch pawl member adjacent said cam follower surface, such that said stop surface contacts a portion of said blocking cam member so as to cease movement of said blocking cam member at said blocking position.

19. The safety lock-out mechanism of claim 18, wherein said pick-up surface and said latch surface on said latch pawl member generally face each other in opposed spaced relation.

20. The safety lock-out mechanism of claim 19, wherein said cam pivot axis and said pawl pivot axis are substantially parallel one to the other.

21. The safety lock-out mechanism of claim 20, wherein said cam pivot axis is disposed forwardly of said pawl pivot axis.

22. The safety lock-out mechanism of claim 21, wherein said blocking cam member pivots in a first pivotal direction about said cam pivot axis and said latch pawl member pivots in the same first pivotal direction about said pawl pivot axis in unison one with another, when respectively acted upon by said drive member and said first cable member.

* * * * *